June 10, 1930.                H. E. ALTGELT                1,762,210
                        GEAR TRANSMISSION LUBRICATION
                          Filed March 14, 1928        2 Sheets-Sheet 1
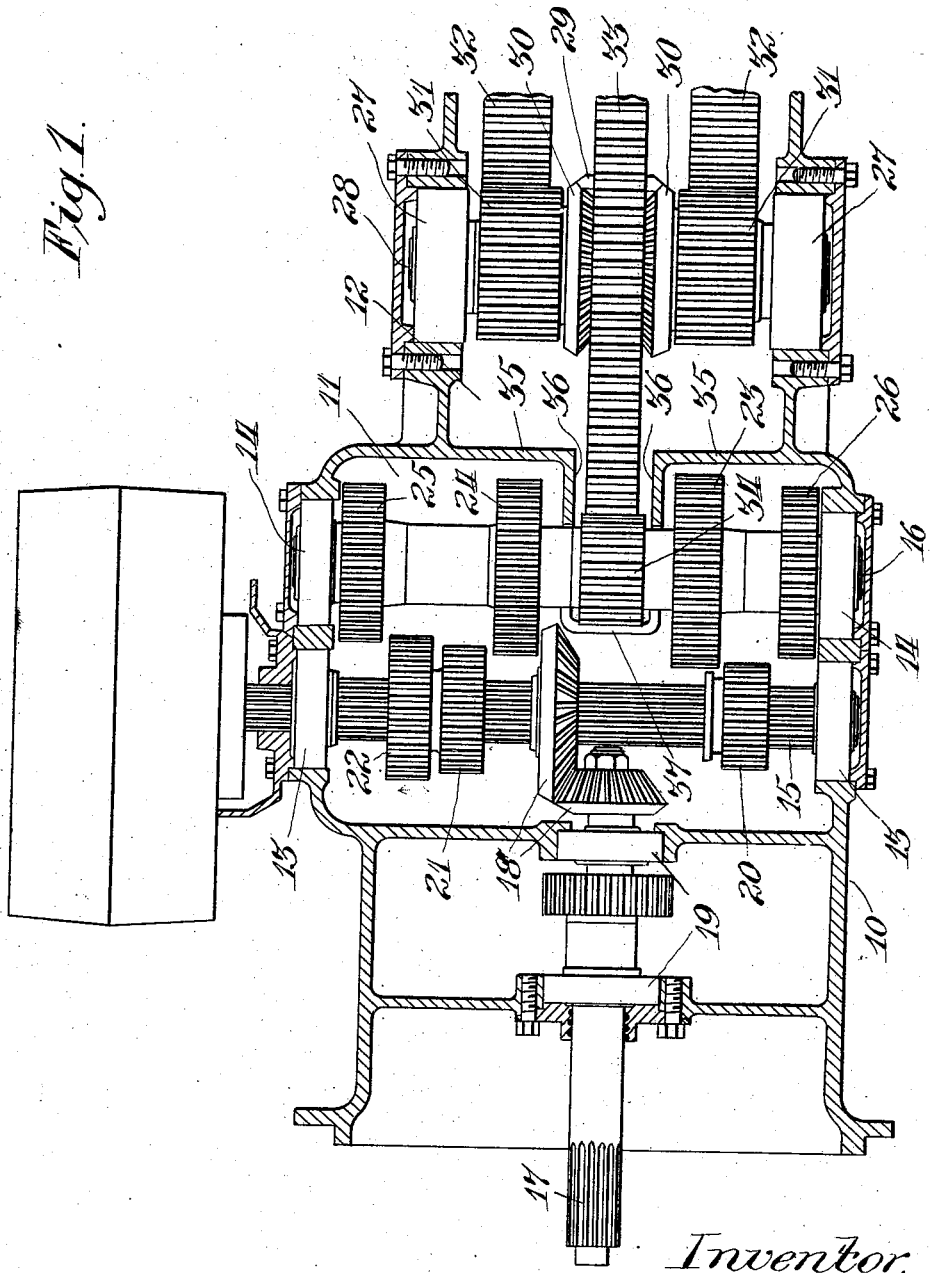

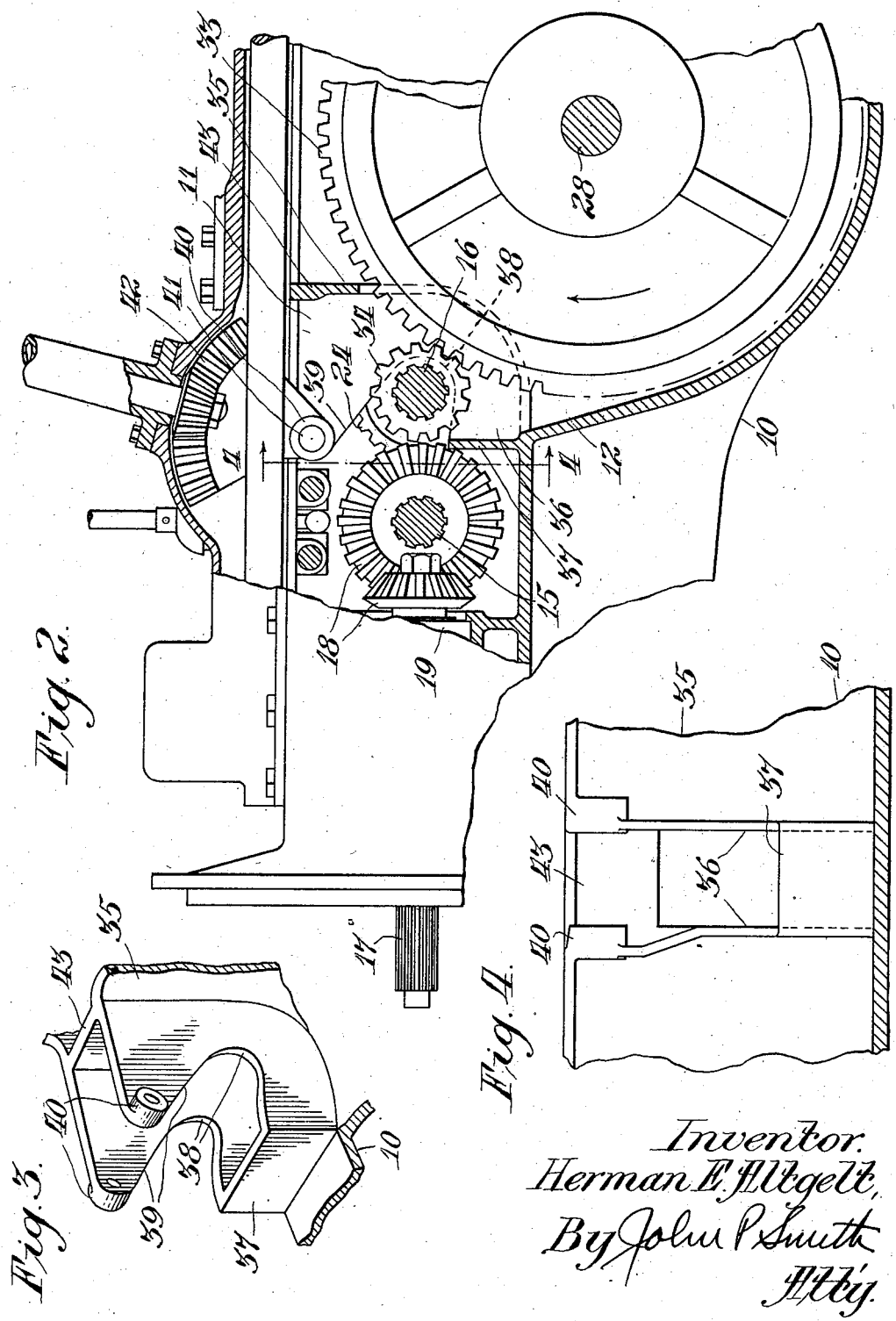

Patented June 10, 1930

1,762,210

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

GEAR-TRANSMISSION LUBRICATION

Application filed March 14, 1928. Serial No. 261,573.

This invention relates to a lubricating feature and more particularly to the construction of a dam in the housing for maintaining a certain level of the lubricant in the transmission compartment or housing, and permitting the lubricant in excess of a certain level to pass over the dam.

One of the objects of the present invention is to provide a novel and improved construction of the transmission and differential housing, whereby the lubricant in the transmission housing is maintained at a certain level therein, and all lubricant in excess of this level will flow into the differential housing.

A further object of the invention is to provide a novel and improved construction of a recessed partition wall located between the housing for the transmission mechanism, and the housing for the differential mechanism, whereby the power is transmitted from one mechanism to the other, and the lubricant supplied from the differential compartment to the transmission compartment, and by reason of this construction, all lubricant in excess of a certain level in the transmission compartment will flow into the differential compartment.

These and other objects are accomplished by providing a construction and an arrangement of the various parts in the manner hereinafter described.

Referring to the drawings, Fig. 1 is a horizontal cross sectional view of the transmission and differential housing together with the respective mechanism mounted therein, showing one embodiment of my improved lubricating construction between the respective differential and transmission mechanism compartments.

Fig. 2 is a fragmentary side elevational view partly in cross section, of the mechanism shown in Fig. 1.

Fig. 3 is a fragmentary perspective view showing the construction of the recess and the lubricant dam located between the respective compartments of the transmission and differential mechanism, and Fig. 4 is a fragmentary front elevational view, partly in cross section, taken on the line 4—4 of Fig. 2, showing the recessed partition wall and lubricant dam shown in Fig. 3.

In illustrating one form of my invention, I have shown the same in connection with a transmission and differential housing generally referred to by reference character 10, of a motor vehicle. This transmission and differential housing is preferably divided into two compartments—a transmission compartment as indicated by reference character 11, and a differential compartment indicated by the reference character 12. Mounted in the transmission compartment 11 and journalled in suitable anti-friction bearings 13 and 14 secured to the side walls of the housing are two transmission shafts the first shaft 15 being a primary transmission shaft, and the second shaft 16 being a supplemental transmission shaft, both of which are arranged parallel to each other, and occupy a position transversely with respect to the longitudinal axis of the housing. The primary transmission housing 15 is geared to and operatively driven by the main power shaft 17 through the medium of the bevel gears 18, one of which is secured to the main power shaft 17, and the other of which is secured to the primary transmission shaft 15. The main power shaft is journalled in suitable anti-friction bearings 19 mounted in suitable transverse walls of the housing 10. Slidably mounted on the transmission shaft 15 are change speed gears 20, 21 and 22. Secured to the supplemental transmission shaft 16, and adapted to be engaged by the respective change speed gears 20, 21 and 22, are the respective gears 23, 24 and 25. Mounted on one end of the supplemental transmission shaft 16, adjacent the gear 23 is a reverse gear 26, which is adapted through the operation of another gear (not shown) for reversing the movement of the vehicle in a manner well understood in the art.

Journalled in the differential compartment 12 of the housing 10 on suitable anti-friction bearings 27 mounted in the opposite side walls thereof, is a differential shaft 28. Mounted on the differential shaft is a differential mechanism 29 (only part of which is shown), and which in turn is operatively geared to the bevel gears 30. The bevel gears 30 have formed integrally therewith, spur gears 31 which in turn mesh with and operatively drive the main drive gears 32 which are secured to the inner ends of the rear axles (not shown). Meshing with the differential ring gear 33 and operatively driven thereby is a pinion 34, which is secured to the supplemental transmission shaft 16 between the gears 23 and 24. For a more complete description of the transmission mechanism herein described, see my co-pending application Serial No. 260,871, filed 12th day of March, 1928.

The principal feature of the present invention consists essentially of the maintenance of a certain level of lubricant in the transmission compartment so that the gears thereof, as well as the bearings are sufficiently lubricated, so as to insure long and efficient service. It is also essential to the efficient operation and to the proper lubrication of the transmission mechanism, that the lubricant be supplied thereto and that all oil in excess of the required amount be discharged therefrom. In order to accomplish these results, I have provided a novel construction of a recessed partition wall and a dam construction between the transmission and differential compartments which simplifies the construction for maintaining the proper level of lubricant in the transmission mechanism.

This comprises a transversely extending partition wall 35 between the transmission compartment 11 and the differential compartment 12. Both sides of this wall extend inwardly toward the longitudinal center of the housing to a point adjacent the differential ring gear 33, and thence extends at right angles forwardly as shown at 36, so as to form a recess. The forwardly extending longitudinal walls or recessed portions are connected together by a transverse dam 37. This dam 37 is located at a point slightly forward of the supplemental transmisison shaft 16. The forwardly extending recessed portions 36 have their portions above the dam 37 cut away as shown at 38 so as to encircle the shaft and the hub of the gears 23 and 24. The upper portion of these side walls 36 are inclined upwardly as shown at 39 and terminate at the opposite bearing portions 40, which form bearings for the shaft 41 of the steering sector 42. This recess formed by the longitudinally extending walls 36 and the dam 37 surrounds or embraces, or rather occupies the space just below the transmission pinion 34 on the transmission shaft 16, so that all the gears mounted on the primary transmission shaft 15 and the supplemental transmission shaft 16 are partially submerged in the lubricant which will be maintained at substantially the height of the dam 37, and any lubricant in excess of the level of the top of the dam 37 will overflow the dam and run back into the differential compartment. Adjacent the top and to the rear of the forwardly projecting recessed walls 36 is a transverse reinforcing web 43 which strengthens this portion of the housing, and is located at a sufficient height to clear the teeth 33 of the differential mechanism.

In the operation of the above described device it will be obvious that as the differential mechanism revolves in the direction indicated by the arrow in Fig. 2, that the lubricant contained in the differential compartment will be elevated or conveyed by the gear teeth with a portion thereof transferred to the pinion 34 of the supplemental transmission shaft 16, and that by reason of the rapid rotation of this pinion 34 the lubricant will be discharged over the dam 37 and into the transmission compartment 11, and when the level of the lubricant in the transmission compartment reaches substantially the height of the dam 37 it will flow over the dam back into the lower portion of the differential compartment. This operation will be continuous and maintained so that the gears as well as the bearings located in the transmission compartment will receive the required lubrication.

It will be seen that by so constructing the partition wall between the transmission compartment and the differential compartment by recessing the same beneath the power pinion which engages the differential ring gear, that I have simplified the construction so as to afford an efficient means of conveying and elevating the lubricant from the lower level of the differential compartment to the higher level of the transmission compartment, and that all excess of lubricant above the required amount necessary for lubricating the bearings and gears of the transmission mechanism will overflow the dam and be returned to the differential compartment.

While in the above specification I have described one embodiment which my invention may assume in practise, it will of course be understood that the same is capable of modification and that modification may be made without departing from the spirit and scope of the invention as expressed in the following claims.

What I claim is my invention and desire to secure by Letters Patent is:

1. In combination with a power transmission mechanism and a differential mechanism, a housing for both of said mechanisms, a partition wall dividing said housing into a transmission compartment and a differential compartment, a power transmission shaft and gearing mechanism mounted in said transmission compartment, a differential gear mechanism mounted in said differential compartment and geared to said transmission mechanism, said partition wall having a recess portion extending beneath one of the gears on one of said transmission shafts, and a dam formed as a part of said recessed partition wall for maintaining sufficient lubricant in said transmission compartment 2. In a lubricating device, the combination with a power transmission and differential housing comprising a transverse wall dividing said housing into a transmission compartment and a differential compartment, a transmission mechanism mounted on said first named compartment, and a differential mechanism mounted in said second named compartment and operatively related to said transmission mechanism, and a dam located under and around one of said transmission gears and connected with the said partition wall for maintaining a certain level of lubricant in said transmission compartment.

3. In a lubricating device, the combination with a transmission and differential housing, of a power transmission mechanism, a partition wall dividing said housing into two compartments, a transmission mechanism located in one compartment, a differential mechanism located in the other compartment and operatively related to said transmission mechanism, and a dam partially surrounding one of the gears on said transmission mechanism and connected with said partition wall for maintaining a certain level of lubricant in said transmission compartment.

4. In a lubricating device, the combination with a housing for a transmission and differential mechanism, a partition wall substantially dividing said housing into two compartments, a transmission mechanism including a plurality of gears mounted in one of the compartments, a differential mechanism mounted in the other compartment and operatively related to said transmission mechanism, and a recessed dam located below one of the gears of said transmission mechanism and connected with said partition wall for maintaining a certain level of lubricant in said transmission compartment.

5. In a lubricating device, the combination with a transmission and differential housing, a partition wall substantially dividing said housing into two compartments, a plurality of parallel and transversely extending transmission shafts mounted in one of said compartments and having a plurality of gears mounted thereon, a differential mechanism mounted in the other said compartment and operatively related to said transmission mechanism, and a dam connected with and inset forwardly of said partition wall below one of said transmission shafts for maintaining the lubricant in said transmission compartment at a certain level.

6. In a lubricating device, the combination of a transmission and differential housing, a partition wall substantially dividing said housing into two compartments, one of said compartments being located at a higher level than the other said compartment, a transmission mechanism including a plurality of shafts and gears mounted in the elevated compartment, a differential mechanism operatively related to said transmission mechanism and mounted in the lower compartment, and a dam located forwardly and below one of the gears on said shaft and connected with said partition wall whereby the lubricant in the lower compartment is elevated by the differential mechanism to the gear operatively connected therewith and discharged over said dam.

7. In a lubricating device, the combination of a transmission and differential housing, a partition wall dividing said housing in to two compartments, a transmission mechanism mounted in one of said compartments comprising a transmission shaft and a supplemental shaft operatively connected therewith, a differential mechanism mounted in the other of said compartments and operatively related to said supplemental transmission shaft, and a dam located in the bottom of said transmission compartment between said transmission shaft and said supplemental transmission shaft and connected with said partition wall for maintaining a certain level of lubricant in said transmission compartment.

8. In a lubricating device, the combination with a transmission and differential housing, said housing being divided into two compartments, a transmission mechanism including a primary and supplemental transmission shaft, a plurality of gears mounted on each of said shafts, a differential mechanism mounted in the other of said compartments and geared to one of the gears on said supplemental shaft, and a dam extending around the said last named gear for maintaining a certain level of lubricant in said transmission compartment.

9. In a lubricating device, the combination with a transmission and differential housing, said housing being divided into substantially two compartments, a transmission mechanism including a primary and supplemental transmission shaft, a plurality of gears mounted on each of said shafts, a differential mechanism mounted in the other of said compartments, and geared to one of the gears of said supplemental shaft, and a dam between the said two compartments and surrounding the said last named gear, whereby the lubricant in said differential compartment is elevated by the ring gear of said differential mechanism through the gear on said supplemental shaft from where it is discharged over said dam into said transmission compartment.

10. In a lubricating device, the combination with a transmission and differential housing, said housing being divided into substantially two compartments, a transmission mechanism comprising a primary and supplemental transmission shaft mounted in one of said compartments, a plurality of change speed gears mounted on said shafts and adapted to be operatively connected together, a drive pinion mounted on said supplemental shaft, a differential mechanism mounted in said differential compartment, and operatively driven by said drive pinion, and a dam embracing the lower portion of said drive pinion for maintaining a certain level of lubricant in said transmission compartment.

In testimony whereof I have signed my name to this specification, on this 10th day of March, A. D. 1928.

HERMAN E. ALTGELT.